(12) United States Patent
Cheung et al.

(10) Patent No.: US 11,581,814 B2
(45) Date of Patent: Feb. 14, 2023

(54) INTEGRATED CURRENT SHARING SCHEMES FOR MULTIPLYING POWER STAGES SUPPORT OF A MULTIPHASE CONTROLLER

(71) Applicant: Renesas Electronics America Inc., Milpitas, CA (US)

(72) Inventors: Chun Cheung, Milpitas, CA (US); Paul Dackow, Austin, TX (US); Brandon Howell, Austin, TX (US); Kunrong Wang, Austin, TX (US); Matthew Harris, Flemington, NJ (US)

(73) Assignee: Renesas Electronics America, Inc., Milpitas, CA (US)

( * ) Notice: Subject to any disclaimer, the term of this patent is extended or adjusted under 35 U.S.C. 154(b) by 0 days.

(21) Appl. No.: 17/346,919

(22) Filed: Jun. 14, 2021

(65) Prior Publication Data
US 2022/0399815 A1  Dec. 15, 2022

(51) Int. Cl.
*H02M 3/158* (2006.01)
*H02M 1/00* (2006.01)

(52) U.S. Cl.
CPC ....... *H02M 3/1586* (2021.05); *H02M 1/0009* (2021.05)

(58) Field of Classification Search
CPC ... H02M 3/1586; H02M 1/0009; H02M 1/084
See application file for complete search history.

(56) References Cited

U.S. PATENT DOCUMENTS

| 2002/0145896 | A1* | 10/2002 | Caruthers | H02M 3/1584 |
| | | | | 363/72 |
| 2014/0334196 | A1* | 11/2014 | Chen | H02M 3/1584 |
| | | | | 363/21.04 |

* cited by examiner

*Primary Examiner* — Kyle J Moody
*Assistant Examiner* — Lakaisha Jackson
(74) *Attorney, Agent, or Firm* — Scully, Scott, Murphy & Presser, P.C.

(57) ABSTRACT

Methods and apparatuses for controlling an apparatus comprising a controller integrated in a first slave device. In an example, the controller can detect a sensed current of the first slave device. The controller can receive a voltage signal associated with a second slave device connected to the first slave device. The controller can generate a correction current based on the sensed current of the first slave device and the voltage signal. The controller can modulate a pulse width modulation (PWM) signal received by the first slave device using the correction current. The controller can control a power converter using the modulated PWM signal.

20 Claims, 9 Drawing Sheets

INTEGRATED CURRENT SHARING SCHEMES FOR MULTIPLYING POWER STAGES SUPPORT OF A MULTIPHASE CONTROLLER

FIELD OF THE DISCLOSURE

This disclosure relates to current sharing schemes in a multiphase system. More specifically, this disclosure relates to slave devices integrated with an apparatus that can perform current sharing schemes to balance current among multiple slave devices in a multiphase system.

BACKGROUND

Different electronic components may be connected to each other in different configurations, such as a master-slave configuration. A master-slave configuration is where one electronic component, such as a master device, controls another electronic component, such as a slave device. The master electronic component may be connected with the slave electronic component via a passive external network and respective connection points in the master and slave device or electronic components. In some examples, a system having a master device controlling multiple slave devices can be referred to as a multiphase network or multiphase system.

An example of a multiphase system can be a multiphase power regulator. A multiphase power regulator can include a plurality of power stages, where these power stages can be slave devices controlled by a master or controller device. The power stages can be referred to as phases, where these phases can be connected in parallel and share the same input and output capacitors. In some examples, an increase in the number of power stages or phases (or phase counts) can reduce the ripple on the input voltage to the system, causing fewer capacitors to be needed to keep the input voltage ripple within specifications. Traditionally, to double (or multiply) power stages support of a multiphase controller, an external device or component is used to balance current among the two power trains so that they can be driven by one PWM line. However, the increased number of phases by using the external device can also increase bill of materials (BOM) cost and printed circuit board (PCB) area. For example, in a case of a 20-Phase PWM controller supporting 40 power stages, it will require more than 180 extra external components. The present disclosure describes various integrated current balance schemes among phases driven by one control line (e.g. PWM output) are proposed, it simplifies the design and significantly reduce components count and layout complexity as well as improve system reliability.

SUMMARY

In an example, an apparatus for performing current sharing schemes is generally described. The controller can be configured to detect a sensed current of the first slave device. The controller can be further configured to receive a voltage signal associated with a second slave device connected to the first slave device. The controller can be further configured to generate a correction current based on the sensed current of the first slave device and the voltage signal. The controller can be further configured to modulate a pulse width modulation (PWM) signal received by the first slave device using the correction current.

In an example, a system for performing current sharing schemes is generally described. The system can include a master device, a first slave device connected to the master device, and a second slave device connected to the master device and the first slave device. The first slave device can be configured to receive a first pulse width modulation (PWM) signal. The first slave device can be further configured to detect a first sensed current. The first slave device can be further configured to receive a first voltage signal associated with the second slave device. The first slave device can be further configured to generate a first correction current based on the first sensed current and the first voltage signal. The first slave device can be further configured to modulate the first PWM signal using the first correction current. The second slave device can be configured to receive a second PWM signal. The second slave device can be further configured to detect a second sensed current. The second slave device can be further configured to receive a second voltage signal associated with the first slave device. The second slave device can be further configured to generate a second correction current based on the second sensed current and the second voltage signal. The second slave device can be further configured to modulate the second PWM signal using the second correction current.

In an example, a method for controlling an apparatus comprising a controller integrated in a first slave device is generally described. The method can include detecting, by the controller, a sensed current of the first slave device. The method can further include receiving, by the controller, a voltage signal associated with a second slave device connected to the first slave device. The method can further include generating, by the controller, a correction current based on the sensed current of the first slave device and the voltage signal. The method can further include modulating, by the controller, a pulse width modulation (PWM) signal received by the first slave device using the correction current. The method can further include controlling, by the controller, a power converter using the modulated PWM signal.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

In some examples, the term electronic component as used herein can include any discrete device or apparatus having input and output connection point(s) such as terminals, leads or pins use to affect electrons and its associated field. The electronic component may be in a package such as a semiconductor integrated circuit (IC). Multiple electronic components may be connected to each other to form the apparatus, devices, and systems described herein.

Figure 1:
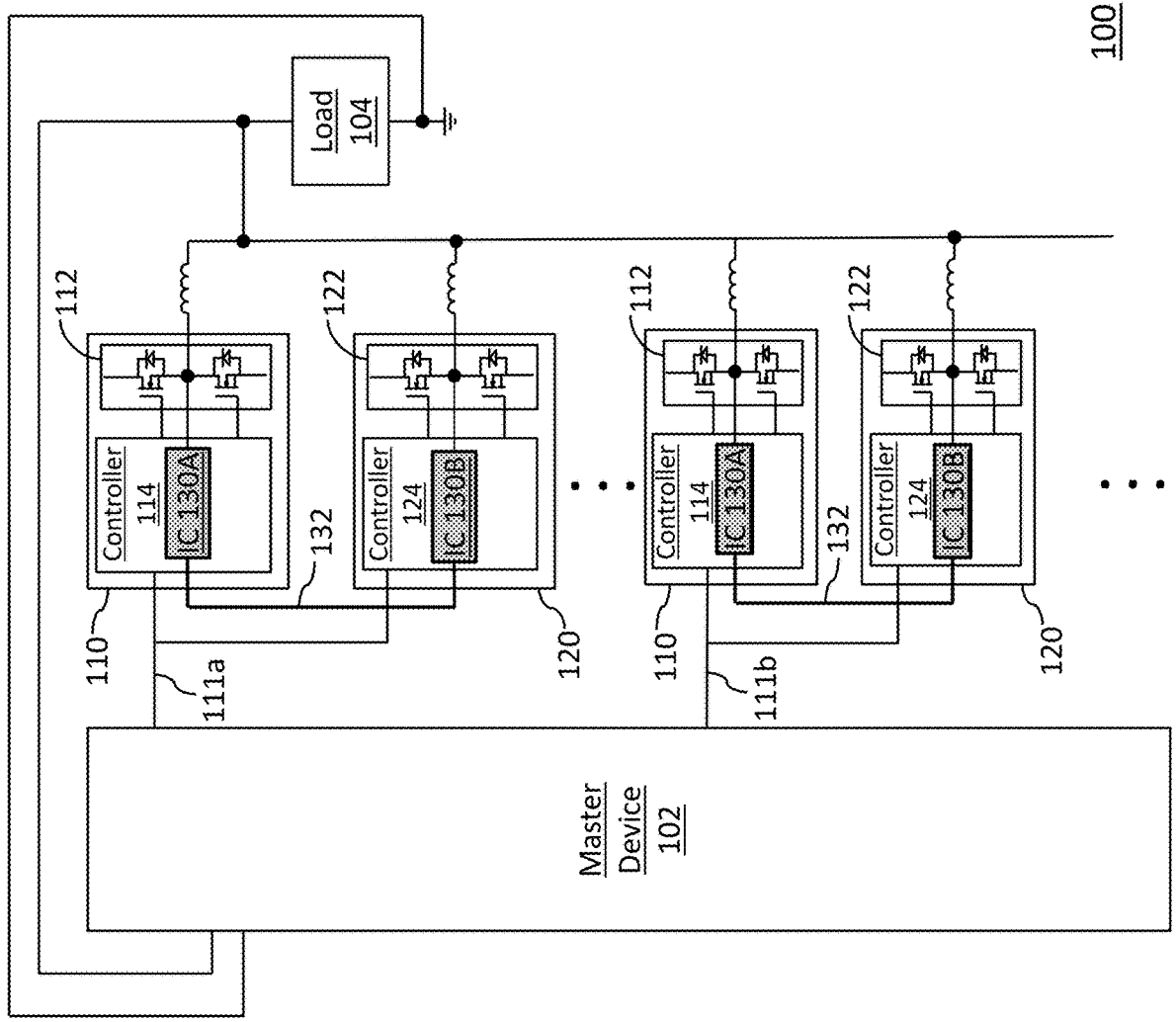
FIG. 1 illustrates a diagram of an example system that includes controller configured to support multiple power stages in multiphase systems in accordance with aspects of the disclosure.

An example system 100 shown in FIG. 1 can be implement integrated current sharing schemes for multiplying power stages support of a multiphase controller. For instance, a 20-phase pulse width modulation (PWM) controller (e.g., a master device) having 20 PWM outputs can be expanded to support 40, 60 or more power stages instead of 20 power stages in a multiphase system (e.g., the system 100). More specifically, multiple slave devices among the system 100 can be integrated with an apparatus that can perform current sharing schemes to balance current among the multiple slave devices, where the multiple slave devices can be driven by the same control signal (e.g., PWM output) in a multiphase system.

FIG. 1 illustrates a diagram of an example system 100 that include a controller 102 configured to support multiple power stages in multiphase systems in accordance with aspects of the disclosure. The system 100 can be a system having a master-slave configuration, where a master device (or electronic component) can control one or more slave devices (or electronic components). In some aspects of the disclosure, the system 100 may be a power system including converters such as DC-DC converters. In the example shown in FIG. 1, the system 100 can include a master device 102, a slave device 110, and a slave device 120. In some examples, the master device 102 can be connected to the slave device 110 and the slave device 120 via a passive external network such as a resistor-capacitor (RC) network. It will be apparent to a person or ordinary skill in the art that the system 100 can include additional sets of slave devices or power stages. For example, the master device 102 (or controller) can control a first set of devices 110 and 120 via a first PWM line 111a, and can control another set of slave devices 110 and 120 can be controlled by another a second PWM line 111b. The separate control lines or PWM lines allow the master device 102 to support additional number of slave devices with minimum external components connected between the controller 102 and the slave devices 110 and 120.

In an example, each one of the slave devices 110 and 120 may be a current-sourced, a voltage-sourced or a device implementing both current and voltage-sourced control. A current-sourced slave device may be controlled by a constant input current outputted from a current source, where this constant input current can be independent of a voltage across the current source. A voltage-sourced slave device may be controlled by a constant voltage outputted from a voltage source. For current-sourced slave devices, a low impedance resistor-capacitor (RC) network (e.g., a passive external network), having a resistor and capacitor connected in parallel, can be connected between the master device and the current-sourced slave devices. For voltage-sourced slave devices, a high impedance resistor-capacitor (RC) network (e.g., a passive external network) can be connected between the master device and the current-sourced slave devices.

The system 100 can be implemented as a multiphase power regulator (e.g., multiphase buck regulator) for a load 104. A multiphase power regulator can include a plurality of power stages, where these power stages can be slave devices (e.g., slave devices 110 and 120) controlled by a master or controller device (e.g., master device 102). In an example, the slave devices 110 and 120 can be smart power stage (SPS) devices configured to perform voltage regulation with additional features such as temperature and current feedback control. The master device 102 can be a controlling device in the multiphase power regulator, such as a digital multiphase controller for one or more power stage devices (e.g., the slave devices 110 and 120). In some examples, the master device 102 may control additional slave devices (e.g., in addition to the slave devices 110 and 120). It will be apparent to a person of ordinary skill in the art that the system 100 can include additional master devices (e.g., a dual master system), slave devices, and intermediate devices. Further, the methods and systems described herein can be applicable to other types of electronic components being implemented as slave devices.

In a multiphase power regulator, each power stage can include its own set of power converter (e.g., DC-DC converter or buck converter), where a power converter can include a set of switching elements such as high side (or upper) and low side (or lower) metal-oxide-semiconductor field-effect transistors (MOSFET). For example, in FIG. 1, the slave device 110 can include a power converter 112 and the slave device 120 can include a power converter 122. In some examples, the power stages can be referred to as phases, where these phases can be connected in parallel and share input and output capacitors. A system having two power stages can be referred to as a double phase system. Some systems can include eight, or twelve, power stages, depending on a desired application utilizing the multiphase power regulator system.

In some examples, an increase in the number of power stages or phases can reduce the ripple on the input voltage to the system, causing fewer capacitors to be needed to keep the input voltage ripple within specifications. However, the increased number of phases can also increase bill of materials (BOM) cost and printed circuit board (PCB) area. Further, as the number of phases increases, the risk of current imbalance among the phases also increases. In order to achieve optimal performance, current among the phases needs to be evenly balanced between phases to avoid thermally stressing any one phase to provide optimal ripple cancellation to address current imbalance.

In an example, the system 100 can operate in a synchronous mode or an interleaving mode. In the synchronous mode, the multiple slave devices are driven by the same PWM signal provided by the master device such that the multiple slave devices can operate synchronously. In interleaving mode, each slave device is driven by a respective pulse-width modulation (PWM) signal, where the PWM signals being used to drive the multiple slave devices can be out of phase. In both the synchronous mode and the interleaving mode, current imbalance can occur when at least one of the multiple slave devices do not receive its PWM signal at one time.

In the example shown in FIG. 1, each slave device, such as slave devices 110 and 120, of the system 100 can include an apparatus 130 (e.g., 130A or 130B) that can be configured to perform current sharing and balancing between the slave devices of the system 100. The apparatus 130 can be an integrated circuit, or a device, embedded or integrated in every slave device of the system 100. The apparatus 130 can be configured to perform current sharing based on data or signals being exchanged among the slave devices using a communication bus 132. In some examples, the apparatus 130 can be integrated or embedded in controllers of the slave device 110 and the slave device 120. For example, the slave device 110 can include a controller 114, where the controller 114 can be integrated with the apparatus 130 (e.g., 130A). The slave device 120 can include a controller 124, where the controller 124 can be integrated with another copy of the apparatus 130 (e.g., 130B). In some examples, the apparatus 130 can include control logic or a controller having one or more integrated circuits, and other electronic components. For example, the apparatus 130 can include one or more amplifiers, comparators, integrators, voltage followers, current sources, resistors, averaging circuits, pulse dividers, pulse width modulators, and/or other types of electronic components.

Using the slave device 110 as an example, the controller 114 can be configured to detect a phase current of the slave device 110. The controller 114 of the slave device 110 can output its phase current as a sensed current to the master device 102. The controller of each slave device in the system 100 can sense its phase current and report its sensed current back to the master device 102. The master device 102 can use the sensed current received from each set of slave devices to perform various control, error detection, and correction functions as well as current balance (if more than one set) among each set of slave devices for the system 100. The current balance within the same set of slave devices (e.g., slave devices 110 and 120) is performed in accordance with aspects of the disclosure.

To be described in more detail below, the apparatus 130 can be designed to include different electronic components depending on various attributes and operation modes of the slave devices of the system 100. Further, the apparatus 130 can be designed to process sensed current from a corresponding slave device and sensed current from other slave devices in order to perform current sharing schemes. For example, the communication bus 132 can be added to the system 100 to connect the slave devices with one another in order for the slave devices to exchange their sensed current, or other signals or data that can be processed by the apparatus 130 to perform current sharing schemes. In an example, the current sharing performed by the apparatus 130 can result in generation of a correction current that can be used to modulate a PWM signal received from the master device 102, or in some instances, from another slave device connected to the communication bus 132.

Figure 2A:
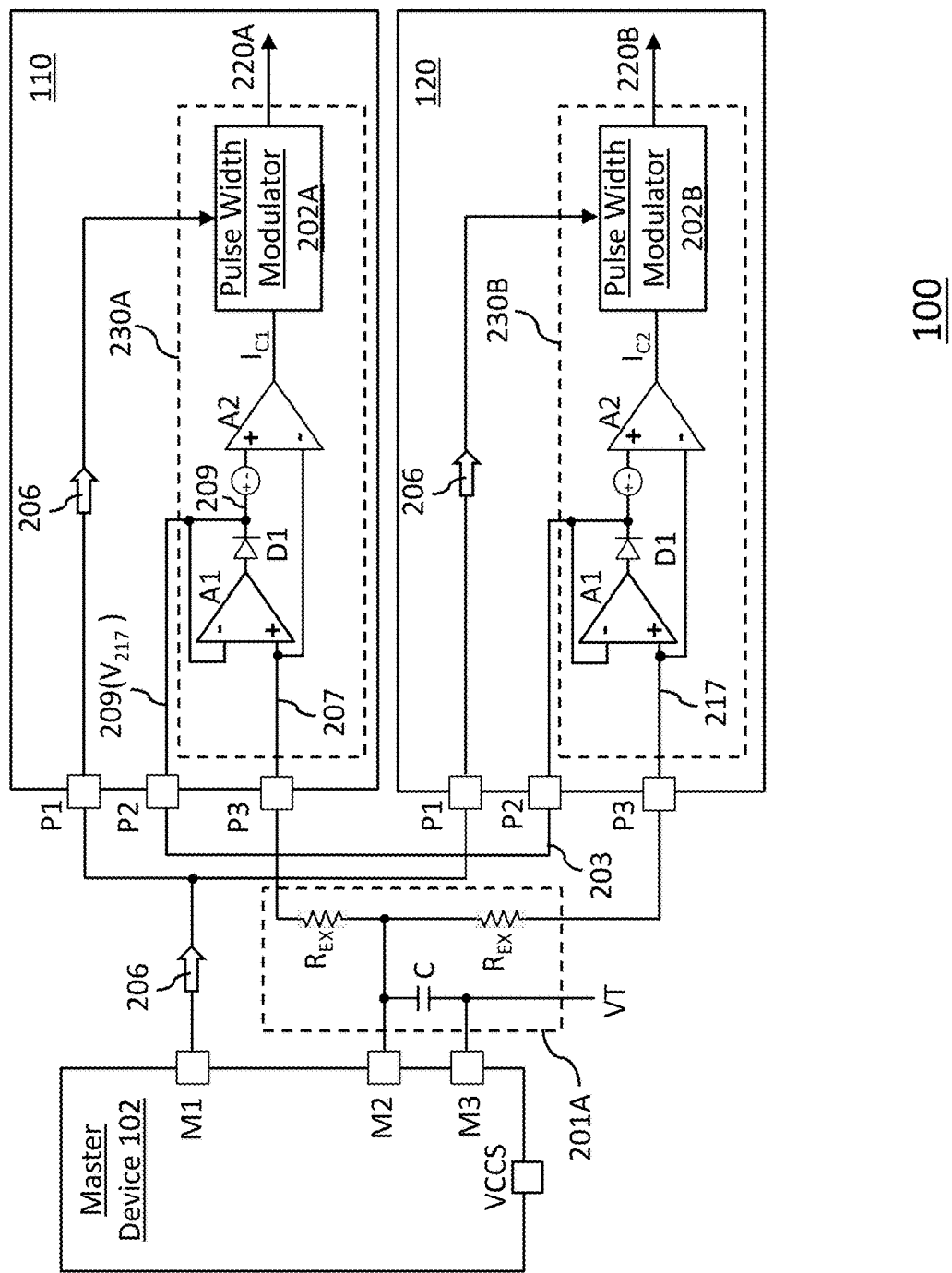
FIG. 2A illustrates a diagram of an apparatus that can implement a current sharing scheme when the current sensed signal is a voltage-sourced output in accordance with aspects of the disclosure.
Figure 2B:
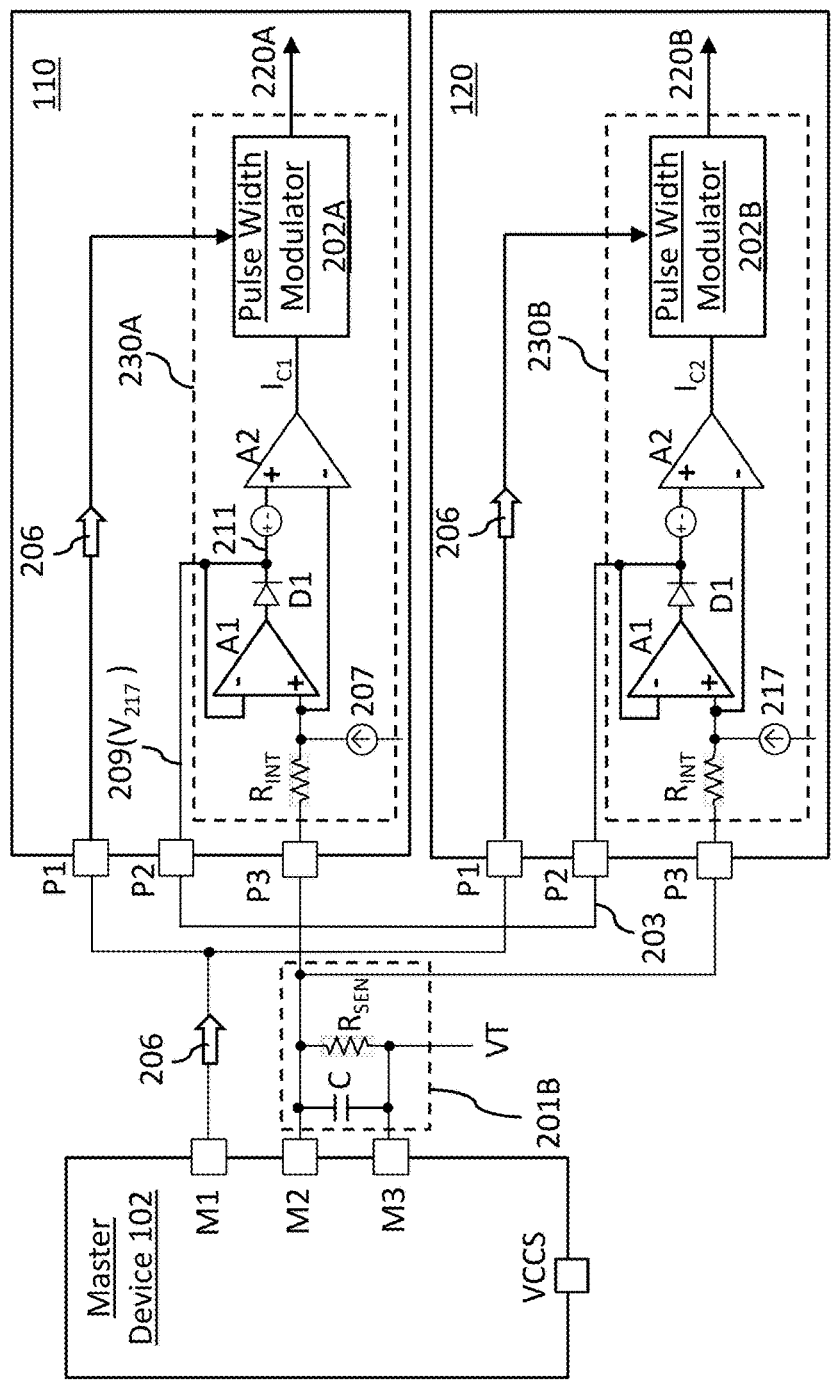
FIG. 2B illustrates a diagram of another apparatus that can implement a current sharing scheme when the current sensed signal is a current-sourced output in accordance with aspects of the disclosure.

FIG. 2A illustrates a diagram of an apparatus that can implement a current sharing scheme when the current sensed signal is a voltage-sourced output (e.g., on the P3 pin) in accordance with aspects of the disclosure. FIG. 2B illustrates a diagram of another apparatus that can implement a current sharing scheme when the current sensed signal is a current-sourced output (e.g., flow through the P3 pin) in accordance with aspects of the disclosure. In the examples shown in FIG. 2A and FIG. 2B, the master device 102 can include one or more interfaces or pins that can be connection points connecting various components of the master device 102 to components and devices outside of the master device 102. For example, the master device 102 can include pins M1, M2, and M3. Further, each slave device of the system 100, such as slave devices 110 and 120, can include its own set of interfaces or pins connecting various components of the slave devices to the master device 102 or other components and devices outside of the slave device. For example, each one of the slave devices 110 and 120 can include a set of pins labeled as P1, P2, and P3.

In an example, the pin M1 can be an output pin and the pin P1 can be an input pin, such that the master device 102 can transmit a PWM signal 206 to the pin P1 of the slave device 110 and the slave device 120. In an example, a synchronous mode of the slave devices 110 and 120 can be enabled such that the master device 102 can transmit the PWM signal 206 to the slave devices 110 and 120 simultaneously. In the example shown in FIG. 2A, the slave devices 110 and 120 can be voltage-sourced devices, such that a passive external network 201A connected between the master device 102 and the slave devices 110 and 120 can be a high impedance network including a capacitor C, and an external resistor $R_{EX}$ for each slave device connected to the master device 102, where the capacitor C can terminate at a voltage VT and the voltage VT can be connected to a supply voltage VCCS (e.g., 1.2 volts (V)) of the master device 102. In the example shown in FIG. 2B, the slave devices 110 and 120 can be current-sourced devices, such that another passive external network 201B connected between the master device 102 and the slave devices 110 and 120 can be a low impedance network including the capacitor C, and a sensing resistor $R_{SEN}$, where the capacitor C and the sensing resistor $R_{SEN}$ are connected in parallel. The resistor $R_{SEN}$ can terminate at the voltage VT.

The pin M2 of the master device 102 can be current sensing input pins configured to receive sensed currents from slave devices. For example, the slave device 110 can transmit a voltage signal created based on its own sensed current 207 ("$V_{207}$") from its pin P3 to the pin M2 of the master device 102, and the slave device 120 can transmit a voltage signal created based on its own sensed current 217 ("$V_{217}$") from its pin P3 to the pin M2 of the master device 102. The pin M3 of the master device 102 can be an output pin connected to an internal differential amplifier in the master device 102.

The pin P2 of the slave devices 110 and 120 can be connected to one another by the communication bus 132 as shown in FIG. 1. In an example, the communication bus 132 can be a share bus 203 shown in FIG. 2A and FIG. 2B, and the apparatus 130A and 130B shown in FIG. 1 can be an apparatus 230A and an apparatus 230B, shown in FIG. 2A and FIG. 2B, respectively. The share bus 203 can connect the P2 pins of all slave devices in the system 100. The slave devices of the system 100 can use the share bus 203 to exchange signals, such as voltage signals created based on respective sensed currents, with one another. The apparatus 230A can include an amplifier A1. The amplifier A1 can be a buffer amplifier configured to output a voltage $V_{207}$ that is created based on the sensed current 207, where the voltage $V_{207}$ can be distributed as a voltage signal onto the share bus 203. The apparatus 230B can also include a copy of the amplifier A1, where the amplifier A1 in the apparatus 230B can be configured to output a voltage $V_{217}$ that is created based on the sensed current 217, where the voltage $V_{217}$ can be distributed as another voltage signal onto the share bus 203. In both apparatus 230A and 230B, a diode D1 can be situated between the output terminal of the amplifier A1 and the non-inverting input terminal of an amplifier A2. The diode D1 in the apparatus 230A can direct $V_{207}$ to drive the share bus 203 and the diode D1 in the apparatus 230B can direct the voltage $V_{217}$ to drive the share bus 203. The voltage among the voltages $V_{207}$ and $V_{217}$ corresponding to the higher sensed current can dominate the share bus 203.

In the examples shown in FIG. 2A and FIG. 2B, the master device 102 can control the slave devices 110 and 120, and any additional slave devices (not shown) of the system 100, using the PWM signal 206. The slave device having the highest sensed current among the slave devices of the system 100 can drive the share bus 203 using the voltage created based on the highest sensed current. For example, the voltage created based on the highest sensed device dominates the share bus 203. If the slave device 120 has the highest sensed current, then the voltage or voltage signal $V_{217}$ can drive the share bus 203 and be distributed to all slave devices that do not have the highest sensed current among the same set of slave device driven by same control signal (e.g. PWM). Thus, any same set (driven by same PWM line) of the slave devices of the system 100 can become the slave device with the highest sensed current (e.g., a master among all slave devices).

In FIG. 2B, the apparatus 230A can include an internal resistor $R_{INT}$ if the slave device 110 is a current-sourced device, and the apparatus 230B can include the internal resistor $R_{INT}$ in response to the slave device 120 being a current-sourced device. The resistor $R_{INT}$ can be trimmed and can convert sensed current signals (e.g., sensed currents 207 and 217) into voltage signals (e.g., $V_{207}$ and $V_{217}$) to drive the share bus 203 via the amplifier A1 in response to the slave devices 110 and 120 being current-sourced devices.

The amplifier A2 of the apparatus 230A can generate an error between voltage $V_{207}$ created by the sensed current 207 and the voltage (labeled as 209) created by the highest sensed current, which in the example is $V_{217}$. In response to the voltage 209 being greater than the $V_{207}$, the amplifier A2 can output a voltage that can create a correction current $I_{C1}$ to a pulse width modulator 202A of the apparatus 230A. The pulse width modulator 202A can receive the PWM signal 206 from the pin P1, and can receive the correction current $I_{C1}$. In an example, the correction current $I_{C1}$ can represent a difference between the highest sensed current 217 and the sensed current 207. The pulse width modulator 202A can modulate the PWM signal 206 using the correction current $I_{C1}$ to generate a modulated PWM signal 220A. The pulse width modulator 202A can modulate the PWM signal 206 by adding an offset to a leading edge, a falling edge, or both leading and falling edges of the PWM signal 206, where the offset can be based on the correction current $I_{C1}$.

In the example shown in FIG. 2A, since the sensed current 217 is the highest sensed current, the amplifier A2 in the apparatus 230B can output a voltage that can create a correction current $I_{C2}$ that may be zero-valued or a null current, to a pulse width modulator 202B of the apparatus 230B. The pulse width modulator 202B can receive the PWM signal 206 from the pin P1, and can receive the correction current $I_{C2}$. In response to the correction current $I_{C2}$ being zero-valued, the pulse width modulator 202B may not need to modulate the PWM signal 206 and can output the PWM signal 206 as a modulated PWM signal 220B. The pulse width modulator 202B can modulate the PWM signal 206 by adding an offset to a leading edge, a falling edge, or both leading and falling edges of the PWM signal 206, where the offset can be based on the correction current $I_{C2}$.

Any additional slave devices in the system 100 can modulate their own copy of PWM signal 206 based on the error between their own sensed current and the sensed current that created the highest voltage 209 being used to drive the share bus 203. By having all same set of slave devices modulate their copy of the PWM signal 206 to match the highest sensed current, the system 100 can output synchronized PWM signals (e.g., modulated PWM signals 220A and 220B) that can be used to drive the power converters (e.g., power converters 112 and 122 shown in FIG. 1) in a synchronized manner and achieve current balance among same set of slave devices.

The examples shown in FIGS. 2A and 2B can include more than two slave devices. In an example where the system 100 can be a double phase count (or two-phase count) system, the share bus 203 can be used to connect individual pairs of slave devices. For example, if the system 100 is a double phase count system including eight slave devices, then a first share bus (e.g., share bus 203) can connect a first pair of slave devices (e.g., slave devices 110 and 120), a second share bus can connect a second pair of slave devices (e.g., a third slave device and a fourth slave device), etc. In another example where the system 100 can be a three-phase count system, the share bus 203 can be used to connect individual slave device sets that have three slave devices. For example, if the system 100 is a three-phase count system including nine slave devices, then a first share bus can connect a first set of slave devices having a first, second, and third slave devices, a second share bus can connect a second set of slave devices having a fourth, fifth, and sixth slave devices, etc. In other words, a N-phase controller (e.g., master device 102) can have N PWM lines (e.g., output N PWM signals) and can multiply the phase count by two times, three times, etc.

Figure 3A:
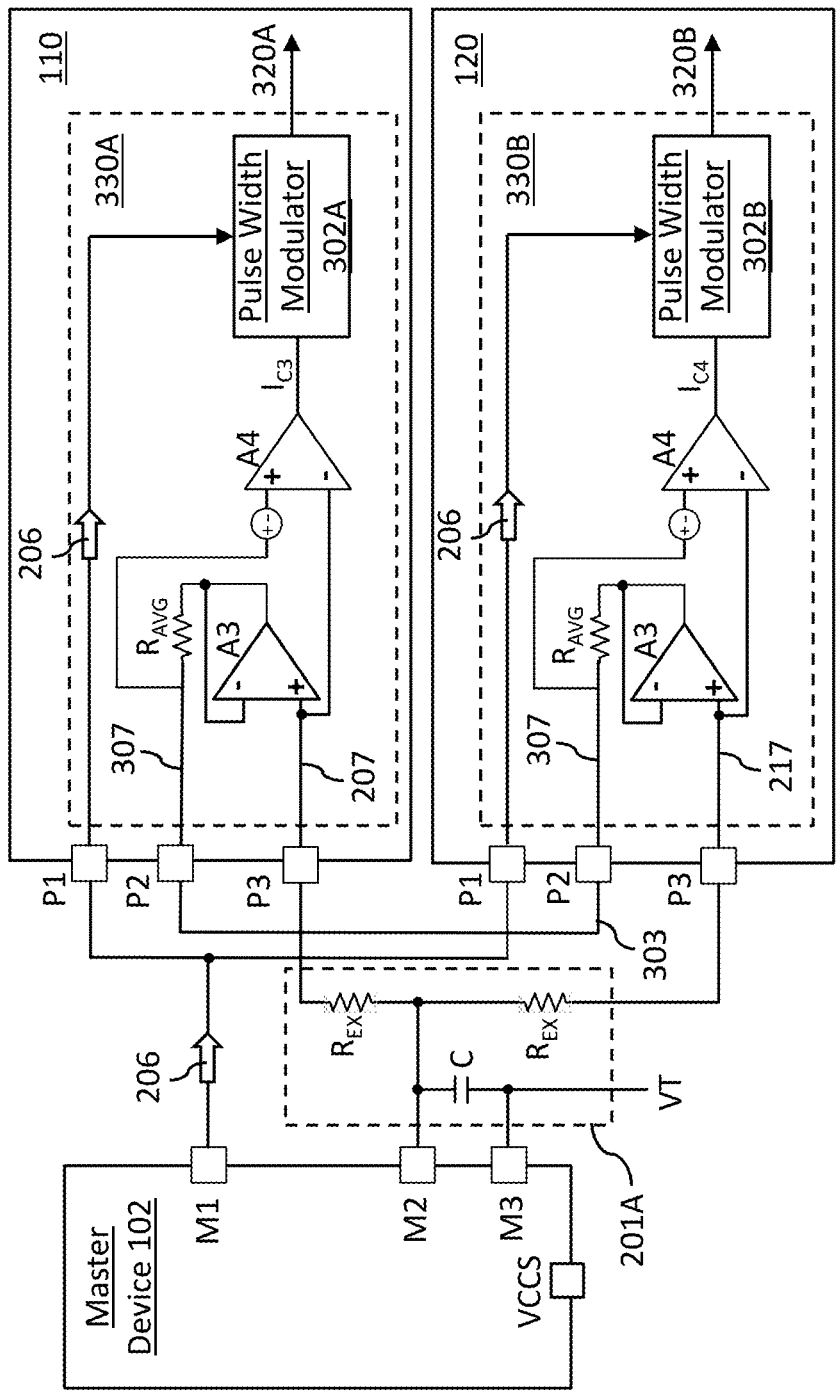
FIG. 3A illustrates a diagram of an apparatus that can implement a current sharing scheme with averaging when the current sensed signal is a voltage-sourced output in accordance with aspects of the disclosure.
Figure 3B:
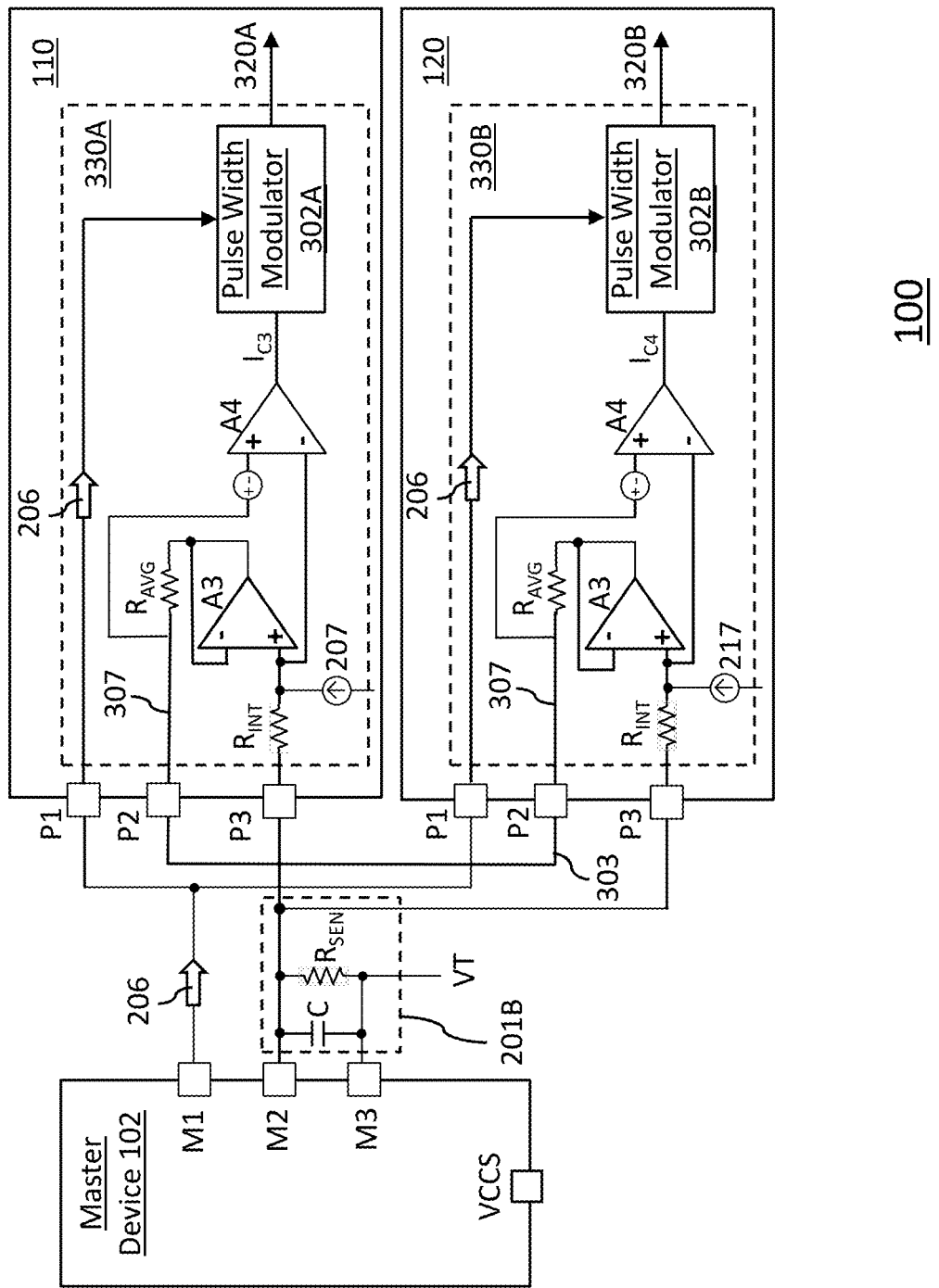
FIG. 3B illustrates a diagram of another apparatus that can implement a current sharing scheme with averaging when the current sensed signal is a current-sourced output in accordance with aspects of the disclosure.

FIG. 3A illustrates a diagram of an apparatus that can implement a current sharing scheme with averaging when the current sensed signal is a voltage source output (e.g., on the P3 pin) in accordance with aspects of the disclosure. FIG. 3B illustrates a diagram of an apparatus that can implement a current sharing scheme with averaging when the current sensed signal is a current-source output (e.g., flow through the P3 pin) in accordance with aspects of the disclosure. In the examples shown in FIG. 3A and FIG. 3B, the synchronous mode of the slave devices 110 and 120 can be enabled such that the master device 102 can transmit the PWM signal 206 to the slave devices 110 and 120 simultaneously. In the example shown in FIG. 3A, the slave devices 110 and 120 can be voltage-sourced devices, such that the passive external network 201A connected between the master device 102 and the slave devices 110 and 120 can be a high impedance network including the capacitor C, and the external resistor $R_{EX}$ for each slave device connected to the master device 102, where the capacitor C can terminate at a voltage VT and the voltage VT can be connected to a supply voltage VCCS of the master device 102. In the example shown in FIG. 3B, the slave devices 110 and 120 can be current-sourced devices, such that the passive external network 201B connected between the master device 102 and the slave devices 110 and 120 can be a low impedance network including the capacitor C, and a sensing resistor $R_{SEN}$, where the capacitor C and the sensing resistor $R_{SEN}$ are connected in parallel. The resistor $R_{SEN}$ can terminate at the voltage VT.

In an example, the communication bus 132 shown in FIG. 1 can be a share bus 303 shown in FIG. 3A and FIG. 3B, and the apparatus 130A and 130B shown in FIG. 1 can be an apparatus 330A and an apparatus 330B shown in FIG. 3A and FIG. 3B, respectively. The share bus 303 can connect the P2 pins of all slave devices in the system 100. The slave devices of the system 100 can use the share bus 303 to exchange signals, such as voltage signals created based on respective sensed currents, with one another.

In the examples shown in FIG. 3A and FIG. 3B, the share bus 303 can be a two-way communication bus including one or more traces that can transmit signal in opposite directions. Thus, any one of the slave devices of the system 100 can output voltage signals to the share bus 303 and also receive voltage signals from the share bus 303. For example, the slave device 110 and the slave device 120 can receive a same external voltage signal 307 from the share bus 303. The external voltage signal 307 can be created by an average current among the sensed currents of all slave devices of the system 100. Each copy of the apparatus 330A or 330B in the slave devices in the system 100 can include an average resistor $R_{AVG}$. Each slave device in the system 100 can apply a voltage proportional to its own sensed current through the average resistor $R_{AVG}$. Thus, the external voltage signal 307 on the share bus 303 can be based on an average current of the sensed currents of all slave devices in the system 100. Therefore, all the slave devices in the system 100 can receive the same external voltage signal 307 that is based on the average current of the sensed currents of all slave devices in the system 100.

The apparatus 330A can include an amplifier A3 (e.g., a buffer amplifier), where the amplifier A3 can output $V_{207}$ onto the share bus 303 via the resistor $R_{AVG}$, such that $V_{207}$ can be averaged into the external voltage signal 307 driving the share bus 303. The voltage $V_{207}$ can also be inputted to an inverting input terminal of another amplifier A4. The external voltage signal 307 received by the slave device 110 can be inputted into a non-inverting input terminal of the amplifier A4 of the apparatus 230A.

The apparatus 330B can also include the amplifier A3, where the amplifier A3 can output the voltage $V_{217}$ onto the share bus 303 via the resistor $R_{AVG}$, such that $V_{217}$ can be averaged into the external current 307 driving the share bus 303. The voltage $V_{217}$ can also be inputted to an inverting input terminal of another amplifier A4 in the apparatus 330B. The external current 307 received by the slave device 120 can be inputted into a non-inverting input terminal of the amplifier A4 of the apparatus 230B.

In FIG. 3B, the apparatus 330A can include the internal resistor $R_{INT}$ in response to the slave device 110 being a current-sourced device, and the apparatus 230B can include the internal resistor $R_{INT}$ in response to the slave device 120 being a current-sourced device. The resistor $R_{INT}$ can be trimmed and can convert sensed current signals (e.g., sensed currents 207 and 217) into voltage signals (e.g., $V_{207}$ and $V_{217}$) to drive the share bus 303 via the amplifier A3 in response to the slave devices 110 and 120 being current-sourced devices.

The amplifier A4 of the apparatus 330A can generate an error between the voltage $V_{207}$ and the external voltage signal 307, and output a voltage that can create a correction current $I_{C3}$ representing a difference between the sensed current 207 with the external current 307. The amplifier A4 can output a voltage that can create the correction current $I_{C3}$ to a pulse width modulator 302A of the apparatus 330A. The pulse width modulator 302A can receive the PWM signal 206 from the pin P1, and can receive the correction current $I_{C3}$. The pulse width modulator 302A can modulate the PWM signal 206 using the correction current $I_{C3}$ to generate a modulated PWM signal 320A. The pulse width modulator 302A can modulate the PWM signal 206 by adding an offset to a leading edge, a falling edge, or both leading and falling edges of the PWM signal 206, where the offset can be based on the correction current $I_{C3}$.

The amplifier A4 of the apparatus 330B can generate an error between $V_{217}$ and the external voltage signal 307, and output a voltage that can create a correction current $I_{C4}$ representing a difference between $V_{217}$ with the external voltage signal 307. The amplifier A4 can output a voltage that can create the correction current $I_{C4}$ to a pulse width modulator 302B of the apparatus 330B. The pulse width modulator 302B can receive the PWM signal 206 from the pin P1, and can receive the correction current $I_{C4}$. The pulse width modulator 302B can modulate the PWM signal 206 using the correction current $I_{C4}$ to generate a modulated PWM signal 320B. The pulse width modulator 302B can modulate the PWM signal 206 by adding an offset to a leading edge, a falling edge, or both leading and falling edges of the PWM signal 206, where the offset can be based on the correction current $I_{C4}$.

The apparatus 330B of the slave device 120 can be identical to the apparatus 330A and operate similarly to the apparatus 330A. In the examples shown in FIG. 3A and FIG. 3B, the individual correction current of each slave device can make up an individual current difference between the corresponding slave device's sensed current and an average current between the sensed currents 207 and 217. For example, the correction current $I_{C3}$ of the slave device 110 can make up the difference between the sensed current 207 and the average current between the sensed currents 207 and 217, and the correction current $I_{C4}$ of the slave device 120 can make up the difference between the sensed current 217 and the average current between the sensed currents 207 and 217. By having all slave devices of the system 100 modulate their copy of the PWM signal 206 using individual correction current that is based on the same average current between the sensed currents 207 and 217, the system 100 can output synchronized PWM signals (e.g., modulated PWM signals 320A and 320B) that can be used to drive the power converters (e.g., power converters 112 and 122 shown in FIG. 1) in a synchronized manner.

The examples shown in FIGS. 3A and 3B can include more than two slave devices. In an example where the system 100 can be a double phase count (or two-phase count) system, the share bus 303 can be used to connect individual pairs of slave devices. For example, if the system 100 is a double phase count system including eight slave devices, then a first share bus (e.g., share bus 303) can connect a first pair of slave devices (e.g., slave devices 110 and 120), a second share bus can connect a second pair of slave devices (e.g., a third slave device and a fourth slave device), etc. In another example where the system 100 can be a three-phase count system, the share bus 303 can be used to connect individual slave device sets that have three slave devices. For example, if the system 100 is a three-phase count system including nine slave devices, then a first share bus can connect a first set of slave devices having a first, second, and third slave devices, a second share bus can connect a second set of slave devices having a fourth, fifth, and sixth slave devices, etc. In other words, a N-phase controller (e.g., master device 102) can have N PWM lines (e.g., output N PWM signals)) and can multiply the phase count by two times, three times, etc.

Figure 4:
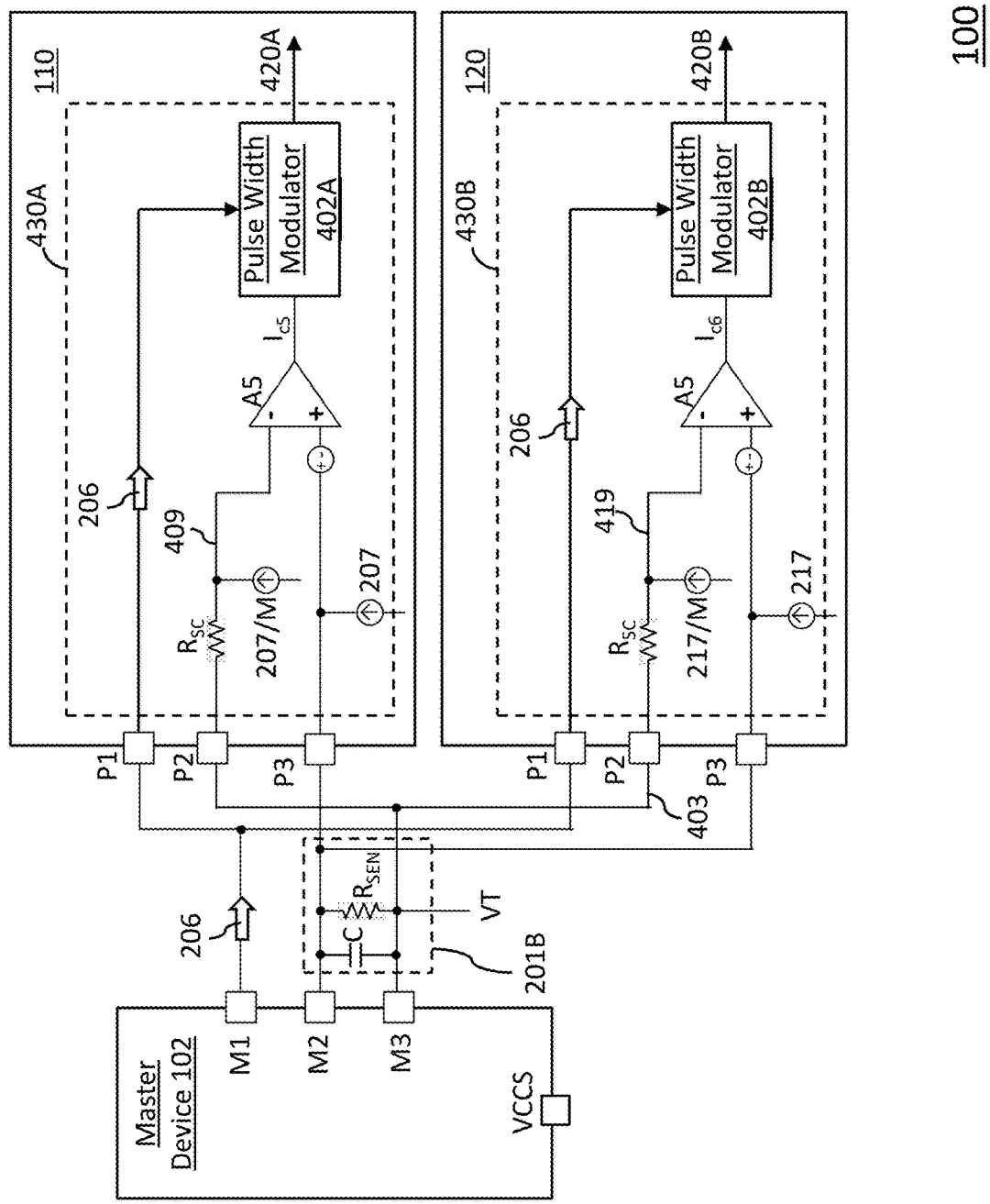
FIG. 4 illustrates a diagram of an apparatus that can implement a scaled current sharing scheme with averaging when the current sensed signal is a current-sourced output in accordance with aspects of the disclosure.

FIG. 4 illustrates a diagram of an apparatus that can implement a scaled current sharing scheme with averaging when the current sensed signal of a slave device is a current-sourced output (e.g., flow through the P3 pin) in accordance with aspects of the disclosure. In the examples shown in FIG. 4, the synchronous mode of the slave devices 110 and 120 can be enabled such that the master device 102 can transmit the PWM signal 206 to the slave devices 110 and 120 simultaneously. In the example shown in FIG. 4, the slave devices 110 and 120 can be current-sourced devices, such that the passive external network 201B connected between the master device 102 and the slave devices 110 and 120 can be a low impedance network including the capacitor C, and a sensing resistor $R_{SEN}$, where the capacitor C and the sensing resistor $R_{SEN}$ are connected in parallel. The resistor $R_{SEN}$ can terminate at the voltage VT.

In an example, the communication bus 132 shown in FIG. 1 can be a communication bus 403 shown in FIG. 4, and the apparatus 130A and 130B shown in FIG. 1 can be an apparatus 430A and an apparatus 430B, respectively, shown in FIG. 4. The communication bus 403 can be connected to the M3 pin of the master device and to the P2 pins of all slave devices in the system 100.

In the example shown in FIG. 4, each slave device 110 and 120 can generate a scaled amount of its own sensed current and feeds this scaled current to a trimmed resistor $R_{SC}$ that matches an external resistor $R_{SEN}$ to create a voltage signal that can be distributed to the communication bus 403. The resistor $R_{SEN}$ can be used for summing all sensed current from the P3 pins of all slave devices in the system 100, such that the trace or line connecting the P3 pins and the M2 pin can represent an average current or average voltage among the slave devices among the system 100. Each slave device can generate an error voltage between a voltage developed based on the scaled current (e.g., through the resistor $R_{SC}$) and the average voltage at the P3 pin to generate a correction current. In an example, the current sharing scheme shown in FIG. 4 can scale the voltage being applied to the inverting input of the amplifier (e.g., amplifier A5 in FIG. 4) as an attempt to minimize an error between the scaled voltage and a voltages created based on a respective sensed current.

In an example, the resistor $R_{SC}$ can have a resistance of $2R_{SEN}M$ where M can be a scale factor that can be used for scaling a sensed current and reduce current consumption as needed. For example, if the system 100 is a double phase count system (e.g., having two slave devices), the resistor $R_{SC}$ can have a resistance of $20R_{SEN}$ (e.g., 20 kiloohms (kΩ)) and the resistor $R_{SEN}$ can be maintained at $R_{SEN}$ (e.g., 1 kΩ). In another example, if the system 100 is has three phases (e.g., having three slave devices), the resistor $R_{SC}$ can remain at, for example, 20 kΩ, and the external resistor $R_{SEN}$ needs to change to, for example, a resistance of $R_{SEN}(2/3)$ or 666Ω.

The slave device 110 can generate a copy of its sensed current 207, and scale it by dividing by M (e.g., labeled as 207/M), to generate a scaled current. The scaled current can flow through the resistor $R_{SC}$ to generate a voltage signal 409 that can be distributed to the communication bus 403. The voltage signal 409 created by the scaled current can be inputted into an inverting input terminal of an amplifier A5. The voltage developed by the sensed current 207, which can be received at the P3 pin, can be inputted into the non-inverting input terminal of the amplifier A5. The amplifier A5 can output a voltage that can create a correction current $I_{C5}$ to a pulse width modulator 402A, where the correction current $I_{C5}$ can represent a difference between the sensed current 207 and the scaled current 207/M corresponding to the voltage signal 409. The pulse width modulator 402A can receive the PWM signal 206 from the pin P1, and can receive the correction current $I_{C5}$. The pulse width modulator 402A can modulate the PWM signal 206 using the correction current $I_{C5}$ to generate a modulated PWM signal 420A. The pulse width modulator 402A can modulate the PWM signal 206 by adding an offset to a leading edge, a falling edge, or both leading and leading edges of the PWM signal 206, where the offset can be based on the correction current $I_{C5}$.

The slave device 120 can generate a copy of its sensed current 217, and scale it by dividing by M (e.g., labeled as 217/M), to generate a scaled current. The scaled current can flow through the resistor $R_{SC}$ to generate a voltage signal 419 that can be distributed to the communication bus 403. The voltage signal 419 created by the scaled current 217/M can be inputted into an inverting input terminal of the amplifier A5 in the apparatus 430b. The voltage signal 419 developed by the sensed current 217, which can be received at the P3 pin, can be inputted into the non-inverting input terminal of the amplifier A5 in the apparatus 430b. The amplifier A5 in the apparatus 430b can output a voltage that can create a correction current $I_{C6}$ to a pulse width modulator 402B, where the correction current $I_{C6}$ can represent a difference or an error between the sensed current 217 and the scaled current 217/M corresponding to the voltage signal 419. The pulse width modulator 402B can receive the PWM signal 206 from the pin P1, and can receive the correction current $I_{C6}$. The pulse width modulator 402B can modulate the PWM signal 206 using the correction current $I_{C6}$ to generate a modulated PWM signal 420B. The pulse width modulator 402B can modulate the PWM signal 206 by adding an offset to a leading edge, a falling edge, or both leading and falling edges of the PWM signal 206, where the offset can be based on the correction current $I_{C6}$.

The correction current $I_{C5}$ can be different from the correction current $I_{C6}$, but the modulated PWM signals 420A and 420B can be in phase. The correction currents $I_{C5}$ and $I_{C6}$ make up different amounts of current difference between the scaled currents 409 and 419, respectively, with the same average current at the P3 pins of all slave devices of the system 100. Any additional slave devices in the system 100 can modulate their own copy of PWM signal 206 based on a respective correction current generated by the same average current. By having all slave devices of the system 100 modulate their copy of the PWM signal 206 using individual correction current that is based on the same average current, the system 100 can output synchronized PWM signals (e.g., modulated PWM signals 420A and 420B) that can be used to drive the power converters (e.g., power converters 112 and 122 shown in FIG. 1) in a synchronized manner and achieve current balance among same set of slave devices.

In some examples, the example shown in FIG. 4 can include more than two slave devices. In an example where the system 100 can be a double phase count (or two-phase count) system, the communication bus 403 can be used to connect individual pairs of slave devices. For example, if the system 100 is a double phase count system including eight slave devices, then a first communication bus (e.g., communication bus 403) can connect a first pair of slave devices (e.g., slave devices 110 and 120), a second communication bus can connect a second pair of slave devices (e.g., a third slave device and a fourth slave device), etc. In another example where the system 100 can be a three-phase count system, the communication bus 403 can be used to connect individual slave device sets that have three slave devices. For example, if the system 100 is a three-phase count system including nine slave devices, then a communication share bus can connect a first set of slave devices having a first, second, and third slave devices, a second communication bus can connect a second set of slave devices having a fourth, fifth, and sixth slave devices, etc.

Figure 5:
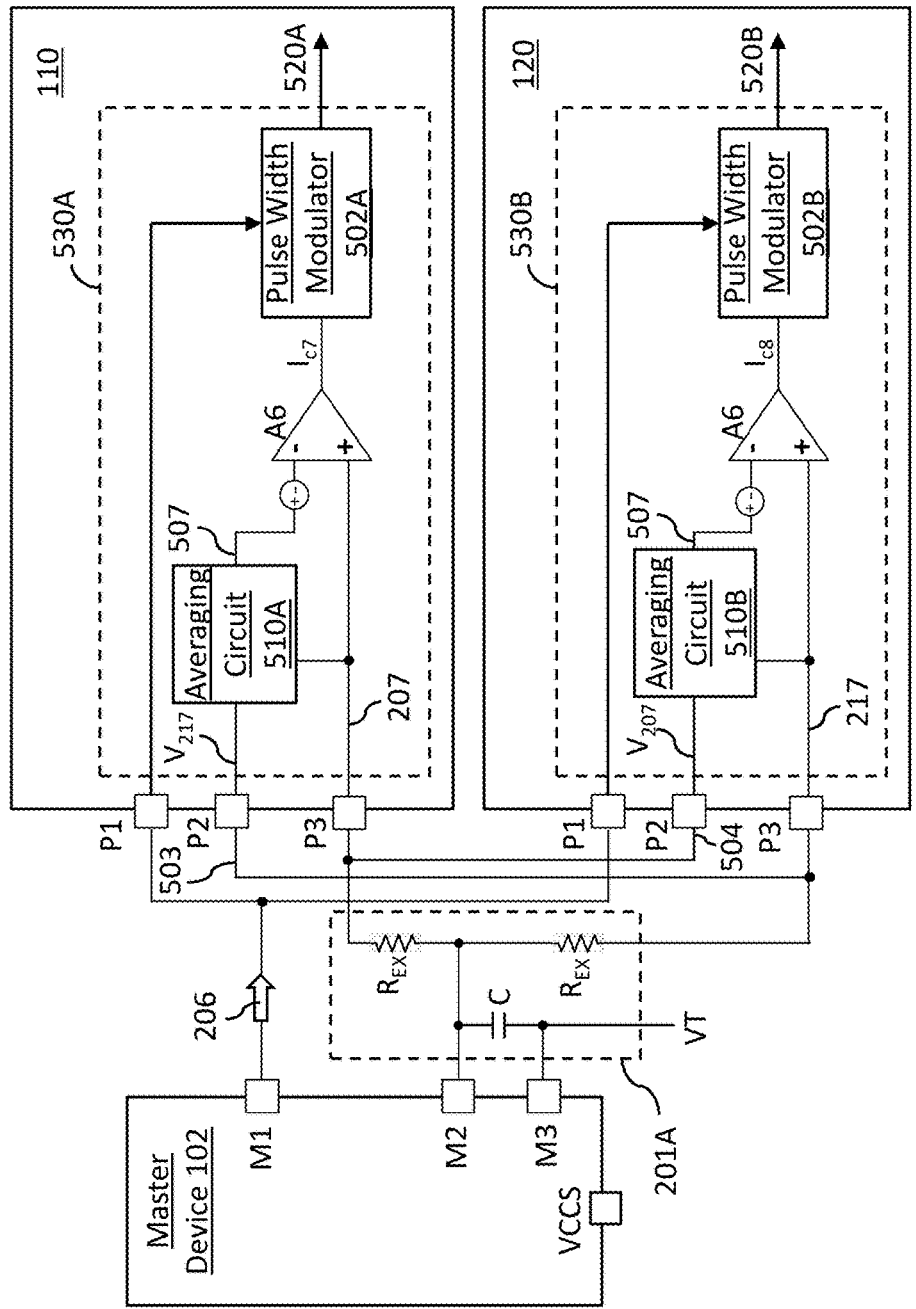
FIG. 5 illustrates a diagram of an apparatus that can implement a current sharing scheme for a double phase system in accordance with aspects of the disclosure.

FIG. 5 illustrates a diagram of an apparatus that can implement a current sharing scheme for a double phase system in accordance with aspects of the disclosure. In the examples shown in FIG. 5, the synchronous mode of the slave devices 110 and 120 can be enabled such that the master device 102 can transmit the PWM signal 206 to the slave devices 110 and 120 simultaneously. In the example shown in FIG. 5, the slave devices 110 and 120 can be voltage-sourced devices, such that the passive external network 201A connected between the master device 102 and the slave devices 110 and 120 can be a high impedance network including the capacitor C, and the external resistor $R_{EX}$ for each slave device connected to the master device 102, where the capacitor C can terminate at a voltage VT and the voltage VT can be connected to a supply voltage VCCS of the master device 102.

In an example, the communication bus 132 shown in FIG. 1 can include a trace 503 and a trace 504 shown in FIG. 5, and the apparatus 130A and 130B shown in FIG. 1 can be an apparatus 530A and an apparatus 530B, respectively, shown in FIG. 5. The trace 503 can connect the P2 pin of the slave device 110 to the P3 pin of the slave device 120. The trace 504 can connect the P3 pin of the slave device 110 to the P2 pin of the slave device 120. The slave device 110 can output its sensed current 207 from its P3 pin to the P2 pin of the slave device 120 using the trace 504. The slave device 120 can output its sensed current 217 from its P3 pin to the P2 pin of the slave device 110 using the trace 503.

The apparatus 530A can include an averaging circuit 510A connected to the P2 pin and the P3 pin of the slave device 110. The averaging circuit 510A of the slave device 110 can receive the voltage $V_{207}$ created based on the sensed current 207 and the voltage $V_{217}$ created based on the sensed current 217, and determine an average current 507 between the sensed current 207 and the sensed current 217. The apparatus 530A can further include an amplifier A6. The averaging circuit 510A can output a voltage that is created based on the average current 507 to an inverting input of the amplifier A6. The amplifier A6 can generate and output a voltage representing a difference or an error between the sensed current 207 with the average current 507. The amplifier A6 can output the generated voltage that can create a correction current $I_{C7}$ to a pulse width modulator 502A of the apparatus 530A. The pulse width modulator 502A can receive the PWM signal 206 from the pin P1, and can receive the generated voltage from the amplifier A6. The pulse width modulator 502A can modulate the PWM signal 206 using the correction current $I_{C7}$ to generate a modulated PWM signal 520A. The pulse width modulator 502A can modulate the PWM signal 206 by adding an offset to a leading edge, a falling edge, or both leading and falling edges of the PWM signal 206, where the offset can be based on the correction current $I_{C7}$.

The apparatus 530B can include an averaging circuit 510B connected to the P2 pin and the P3 pin of the slave device 120. The averaging circuit 510B of the slave device 120 can receive the voltage $V_{207}$ and $V_{217}$, and determine the average current 507 between the sensed current 207 and the sensed current 217. The apparatus 530B can further include the amplifier A6. The averaging circuit 510B can output the voltage that is created based on the average current 507 to an inverting input of the amplifier A6. The amplifier A6 of the apparatus 530B can generate and output a voltage representing a difference between the sensed current 217 and the average current 507. The amplifier A6 can output the voltage that can create a correction current $I_{C3}$ to a pulse width modulator 502B of the apparatus 530B. The pulse width modulator 502B can receive the PWM signal 206 from the pin P1, and can receive the generated voltage from the amplifier A6. The pulse width modulator 502B can modulate the PWM signal 206 using the correction current $I_{C3}$ to generate a modulated PWM signal 520B. The pulse width modulator 502B can modulate the PWM signal 206 by adding an offset to a leading edge, a falling edge, or both leading and falling edges of the PWM signal 206, where the offset can be based on the correction current $I_{C3}$.

The correction current $I_{C7}$ can be different from the correction current $I_{C3}$, but the modulated PWM signals 520A and 520B can be in phase, because the correction currents $I_{C7}$ and Ica make up different amounts of current difference between the sensed currents 207 and 217, respectively. By having the pair of slave devices 110 and 120 of the system 100 modulate their copy of the PWM signal 206 using individual correction current that is based on the same average current, the system 100 can output synchronized PWM signals (e.g., modulated PWM signals 520A and 520B) that can be used to drive the power converters (e.g., power converters 112 and 122 shown in FIG. 1) in a synchronized manner and achieve current balance among same set of slave devices.

Figure 6:
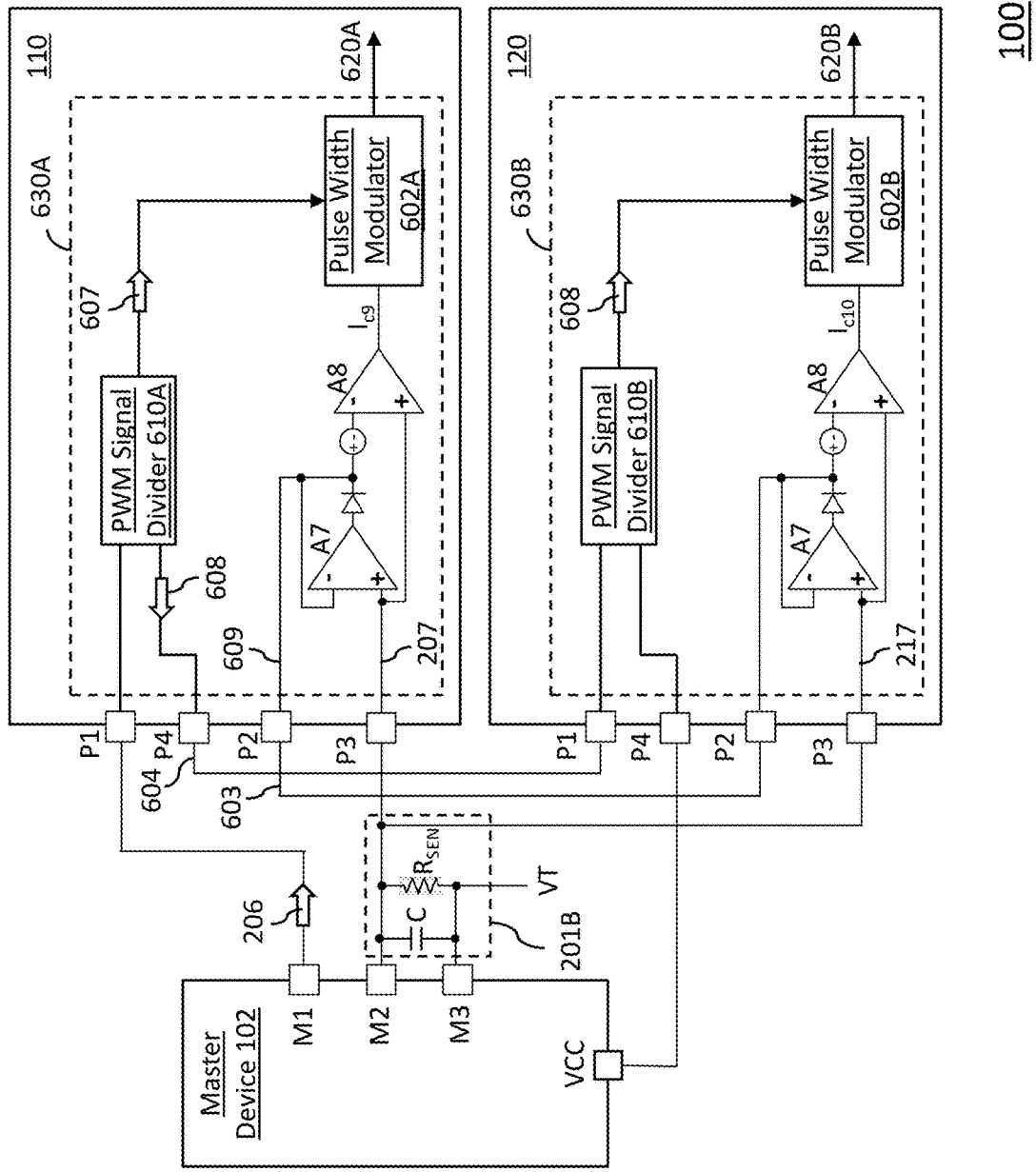
FIG. 6 illustrates a diagram of an apparatus that can implement a current sharing scheme with a pulse divider for interleaving operation in accordance with aspects of the disclosure.

FIG. 6 illustrates a diagram of an apparatus that can implement a current sharing scheme with additional pulse divider in accordance with aspects of the disclosure. The example shown in FIG. 6 can be applied as one or more of the current sharing schemes shown in FIG. 2A to FIG. 5 with an additional pulse divider. Further, the example shown in FIG. 6 can alternatively output the PWM signal 206 to every other slave device (e.g., the second slave device 120 among each pair or set of slave devices) to achieve interleaving operation (e.g., 180 degrees out of phase among two slave devices) among slave devices. In the examples shown in FIG. 6, the slave devices 110 and 120 can output out-of-phase PWM signals 620A and 620B. For example, the master device 102 can transmit the PWM signal 206 to the slave device 110, and the slave device 110 can split the PWM signal 206 and provide one of the PWM signals from the split to the slave device 120. In the example shown in FIG. 6, the slave devices 110 and 120 can be current-sourced devices, such that the passive external network 201B connected between the master device 102 and the slave devices 110 and 120 can be a low impedance network including the capacitor C, and a sensing resistor $R_{SEN}$, where the capacitor C and the sensing resistor $R_{SEN}$ are connected in parallel. However, it will be apparent to a person of ordinary skill in the art that the current sharing scheme described in accordance with FIG. 6 can be applicable to a system having voltage-sourced slave devices. In an example, the PWM signal dividers 610A and 610B, and the pins P4, can be added to the example systems shown in FIG. 2A to FIG. 3B to facilitate current sharing with pulse divider as described in accordance with the example of FIG. 6. For example, the example in FIG. 6 can be a modification of the example system in FIG. 2A by adding the PWM signal dividers 610A and 610B, and the pins P4 to the slave devices 110 and 120.

In an example, the communication bus 132 shown in FIG. 1 can include a trace 603 and a trace 604 shown in FIG. 6, and the apparatus 130A and 130B shown in FIG. 1 can be an apparatus 630A and an apparatus 630B, respectively, shown in FIG. 6. The trace 603 can be a share bus connecting the P2 pins of the slave devices 110 and 120. The trace 604 can connect a pin P4 of the slave device 110 to the P1 pin of the slave device 120.

In the example shown in FIG. 6, each slave device can include a PWM signal divider. For example, the slave device 110 can include a PWM signal divider 610A and the slave device 120 can include a PWM signal divider 610B. The slave device 110 can receive the PWM signal 206 at the pin P1 and the PWM signal 206 can be inputted in to the PWM signal divider 610A. The PWM signal divider 610A can split or divide the PWM signal 206 into two PWM signals 607 and 608 that can be out of phase. The PWM signal divider 610A can output the PWM signal 607 to a pulse width modulator 602A of the apparatus 630A, and can output the PWM signal 608 to the P1 pin of the slave device 120 via the P4 pin of the slave device 110. The P4 pin of the slave device 120 can be connected to a supply voltage pin VCC of the master device 102, such that the slave device 120 can have its synchronous mode enabled and the PWM signal 608 may not be divided by the PWM signal divider 610B. It will be apparent to a person of ordinary skill in the art that the roles of the slave devices 110 and 120 can be interchangeable. For example, the master device 102 can send the PWM signal 206 to the slave device 120, where the slave device 120 can perform the PWM division and supply the divided PWM signal to the slave device 110.

In an example, the pulse divider scheme shown in FIG. 6 can be implemented with one or more current sharing schemes described herein (e.g., FIG. 2A to FIG. 5). For example, to implement the pulse divider with the current sharing schemes of FIG. 2B, a voltage created by the highest sensed current among sensed currents of the devices 110 and 120 can drive the trace or share bus 603. In the example shown in FIG. 6, the sensed current 217 can be the highest sensed current such that a voltage signal 609, created by the sensed current 217, can drive the share bus 603.

The slave device 110 can receive the voltage signal 609 via its P2 pin. The apparatus 630A can include an amplifier A7 (e.g., a buffer amplifier), where the amplifier A7 can output a voltage that can create the sensed current 207 onto the share bus 603. The sensed current 207 can also be inputted to an inverting input terminal of another amplifier A8. The voltage signal 609 received by the slave device 110 can be inputted into a non-inverting input terminal of the amplifier A8 of the apparatus 630A. The amplifier A8 can generate a voltage representing an error between the sensed current 207 and the highest sensed current (e.g., sensed current 217). The voltage being outputted by the amplifier A8 can indicate that the sensed current 217 is greater than the sensed current 207 in response to the sensed current 217 being the highest sensed current. The voltage being outputted by the amplifier A8 can a correction current $I_{C9}$, where the correction current IC9 can be inputted into the pulse width modulator 602A of the apparatus 630A.

The slave device 120 can also receive the voltage signal 609 via its P2 pin. The apparatus 630B can also include the amplifier A7, where the amplifier A7 can output a voltage that can create the sensed current 217 onto the share bus 603. The sensed current 217 can also be inputted to an inverting input terminal of the amplifier A8 in the apparatus 630B. The voltage signal 609 received by the slave device 120 can be inputted into a non-inverting input terminal of the amplifier A8 of the apparatus 630B. The amplifier A8 in the apparatus 630B can generate a voltage representing an error between the sensed current 217 and the highest sensed current (e.g., sensed current 217). In an example, in response to the sensed current 217 being the highest sensed current among the slave devices of the system 100, a current based on the voltage signal 609 can be the same as the sensed current 217. The amplifier A2 of the apparatus 630B can output a voltage that can create a correction current $I_{C10}$, that may be zero-valued or a null current, to a pulse width modulator 602B of the apparatus 630B.

In FIG. 6, the apparatus 630A can include the internal resistor $R_{INT}$ in response to the slave device 110 being a current-sourced device, and the apparatus 230B can include the internal resistor $R_{INT}$ in response to the slave device 120 being a current-sourced device. The resistor $R_{INT}$ can be trimmed to balance the amplifier A7 in response to the slave devices 110 and 120 being current-sourced devices.

The pulse width modulator 602A can receive the PWM signal 607 from the PWM signal divider 610A, and can receive the correction current $I_{C9}$. In an example, the correction current $I_{C9}$ can represent a difference between the external current 609 and the sensed current 207. The pulse width modulator 602A can modulate the PWM signal 607 using the correction current $I_{C9}$ to generate a modulated PWM signal 620A. The pulse width modulator 602A can modulate the PWM signal 607 by adding an offset to a leading edge, a falling edge, or both leading and falling edges of the PWM signal 607, where the offset can be based on the correction current $I_{C9}$.

The pulse width modulator 602B can receive the PWM signal 608 from the PWM signal divider 610B, and can receive the correction current $I_{C10}$. In response to the correction current $I_{C10}$ being zero-valued, the pulse width modulator 602B may not need to modulate the PWM signal 608 and can output the PWM signal 608 as the modulated PWM signal 620B. The pulse width modulator 602B can modulate the PWM signal 608 by adding an offset to a leading edge, a falling edge, or both leading and falling edges of the PWM signal 608, where the offset can be based on the correction current $IC_{10}$.

Any additional slave devices in the system 100 can modulate their own copy of PWM signal based on a difference or an error between voltages created based on their own sensed current and the voltage signal 609 distributed on the share bus 603. By having all slave devices of the system 100 modulate their copy of the PWM signal to match the highest sensed current, the system 100 can balance the current among the slave devices and drive the power converters (e.g., power converters 112 and 122 shown in FIG. 1) using PWM signals that have balanced currents.

The examples shown in FIG. 6 can include more than two slave devices. In an example where the system 100 can be a double phase count (or two-phase count) system, the share bus 603 and the trace 604 can be used to connect individual pairs of slave devices. For example, if the system 100 is a double phase count system including eight slave devices, then a first share bus (e.g., share bus 603) and a first trace (e.g., trace 604) can connect a first pair of slave devices (e.g., slave devices 110 and 120), a second share bus and a second trace can connect a second pair of slave devices (e.g., a third slave device and a fourth slave device), etc. In another example where the system 100 can be a three-phase count system, the share bus 603 and the trace 604 can be used to connect individual slave device sets that have three slave devices. For example, if the system 100 is a three-phase count system including nine slave devices, then a first share bus and a first trace can connect a first set of slave devices having a first, second, and third slave devices, with one of the first, second, and third slave devices having its P4 pin tied to VCC of the master device, and a second share bus and a second trace can connect a second set of slave devices having a fourth, fifth, and sixth slave devices, with one of the fourth, fifth, and sixth slave device having its P4 pin tied to VCC (say 3.3V) of the master device, etc.

The systems and apparatuses described in accordance with the present disclosure can allow a plurality of slave devices connected in parallel to perform various current sharing and balancing schemes. By having the slave devices performing the current sharing schemes described herein, additional phase doublers or current balancing circuits may not be needed between the master device and the slave devices, leading to reduction in printed circuit board space. Further, the apparatus described herein can be constructed using different components to perform different current sharing schemes, which allows the apparatus to be designed based on a desired application or other attributes such as available board space on a printed circuit board. Further, the apparatus described herein can be integrated into slave devices having power converters of other types of integrated circuits without performing excessive amount of modification to the existing device.

Figure 7:
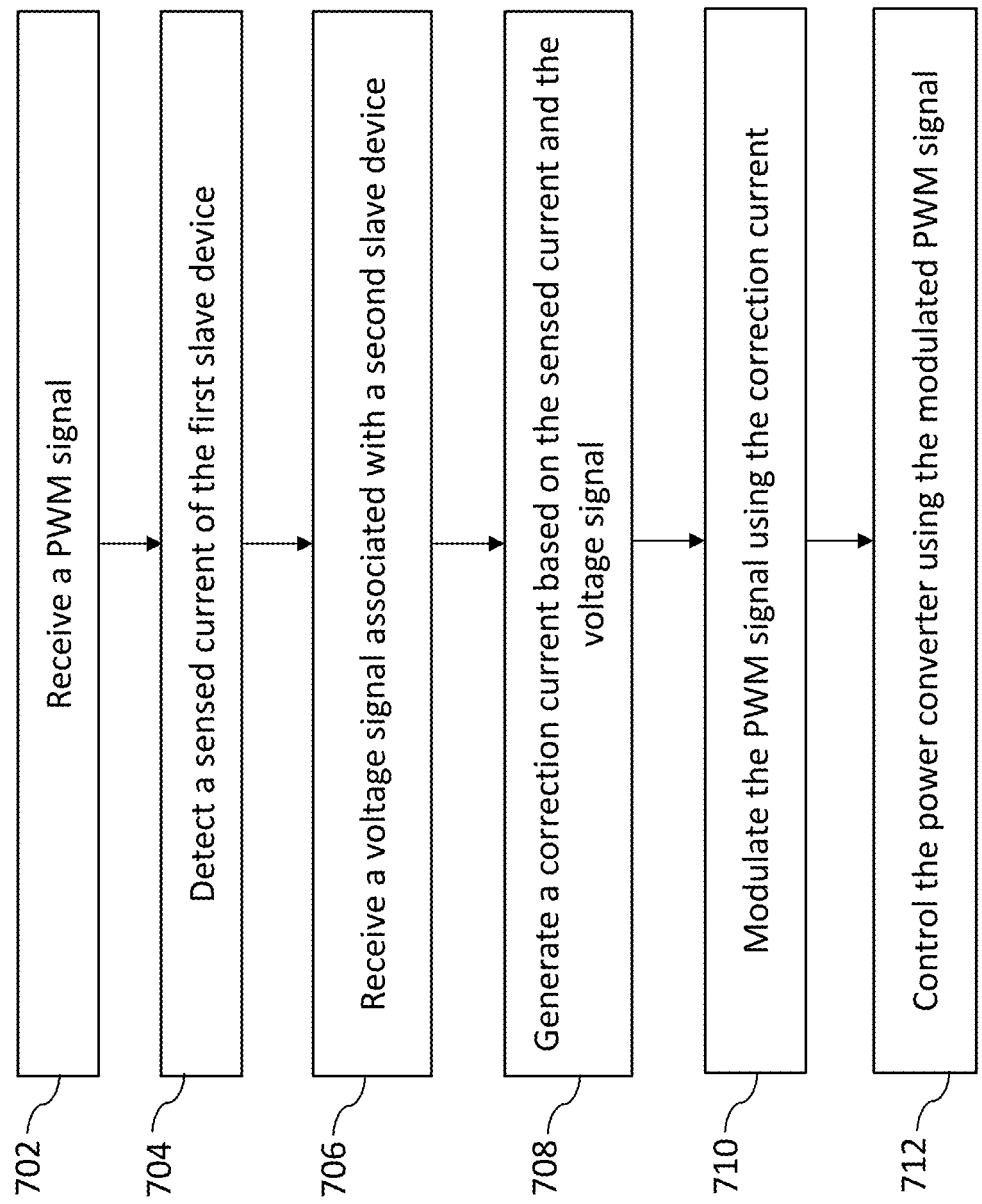
FIG. 7 is a flow diagram illustrating a process of implementing current sharing among slave devices that are driven by one control signal in multiphase systems in accordance with aspects of the disclosure.

FIG. 7 is a flow diagram illustrating a process 700 to implement current sharing among slave devices that are driven by one control signal (e.g., a PWM output) in multiphase systems in accordance with aspects of the disclosure. The process can include one or more operations, actions, or functions as illustrated by one or more of blocks 702, 704, 706, 708, 710, and/or 712. Although illustrated as discrete blocks, various blocks can be divided into additional blocks, combined into fewer blocks, eliminated, or performed in parallel, depending on the desired implementation.

The process 700 can begin at block 702. At block 702, a controller integrated in a first slave device can receive a PWM signal. The first device can include the controller and a power converter connected to the controller. The process 700 can proceed from block 702 to block 704. At block 704, the controller can detect a sensed current of the first slave device. In an example, the sensed current of the first slave device can be a phase current associated with an output of the first slave device. The process 700 can proceed from block 704 to block 706. At block 706, the controller can receive a voltage signal associated with a second slave device. The second device can include another power converter. The process 700 can proceed from block 706 to block 708. At block 708, the controller can generate a correction current based on the sensed current and the voltage signal. The process 700 can proceed from block 708 to block 710. At block 704, the controller can modulate the PWM signal using the correction current. The process 700 can proceed from block 710 to block 712. At block 712, the controller can control the power converter using the modulated PWM signal.

In a first embodiment, in response to the sensed current of the first slave device being less than the sensed current of the second slave device, the voltage signal can represent a difference between the sensed current of the first slave device and a sensed current of the second slave device. The correction current can be a current difference between the sensed current and current corresponding to the voltage signal (e.g., a sensed current that created the voltage signal). If the sensed current is greater than or equal to the current corresponding to the voltage signal, the controller can output a zero-valued current as the correction current and control the power converter using the PWM signal. Further, the external current in the first embodiment can be a difference between the sensed current of the first slave device and a highest sensed current among a plurality of slave devices connected in parallel via a share bus, where the plurality of slave devices can include the first slave device and the second slave device.

In a second embodiment, the voltage signal can be based on an average current among a plurality of sensed currents of a plurality of slave devices. The plurality of sensed currents can include the sensed current of the first slave device and a sensed current of the second slave device. The plurality of slave devices can include the first slave device and the second slave device. The plurality of slave devices can be connected in parallel via a share bus. The correction current can be a current difference between the sensed current and the average current.

In a third embodiment, the voltage signal can be based on a scaled amount of the sensed current of the first slave device. The correction current can be a current difference between the sensed current and the scaled amount of the sensed current.

In a fourth embodiment, the voltage signal can be based on a sensed current of the second slave device. The controller can be configured to determine an average current between the sensed current of the first slave device and the sensed current of the second slave device. The correction current can be a current difference between the sensed current of the first slave device and the average current.

In a fifth embodiment, the controller can divide the PWM signal into a first PWM signal and a second PWM signal. The first PWM signal and the second PWM signal can be out of phase. The controller can output the second PWM signal to the second slave device. The modulation of the PWM signal can include a modulation of the first PWM signal using the correction current.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
a controller integrated in a first slave device, the controller being configured to:
  detect a sensed current of the first slave device;
  receive a voltage signal associated with a second slave device connected to the first slave device;
  generate a correction current based on the sensed current of the first slave device and the voltage signal, wherein the correction current represents a current difference between the sensed current of the first slave device and at least an average current between the sensed current of the first slave device and the sensed current of the second slave device; and
  modulate a pulse width modulation (PWM) signal received by the first slave device using the correction current.

2. The apparatus of claim 1, wherein in response to the sensed current of the first slave device being less than a sensed current of the second slave device:
  the correction current represents a current difference between the sensed current of the first slave device and a current corresponding to the voltage signal.

3. The apparatus of claim 1, wherein:
  the voltage signal is based on an average current among a plurality of sensed currents of a plurality of slave devices;
  the plurality of sensed currents includes the sensed current of the first slave device and the sensed current of the second slave device;
  the plurality of slave devices includes two or more slave devices, the two or more slave devices include the first slave device and the second slave device; and
  in response to the voltage signal being based on the average current among the plurality of sensed currents, the correction current further represents a current difference between the sensed current of the first slave device and the average current among the plurality of sensed currents.

4. The apparatus of claim 1, wherein:
  the voltage signal is based on a scaled amount of the sensed current of the first slave device; and
  in response to the voltage signal being based on the scaled amount of the sensed current of the first slave device, the correction current further represents a difference between the sensed current of the first slave device and the scaled amount of the sensed current of the first slave device.

5. The apparatus of claim 1, wherein:
  the voltage signal is based on the sensed current of the second slave device; and
  the controller is configured to determine, based on the voltage signal, the average current between the sensed current of the first slave device and the sensed current of the second slave device.

6. The apparatus of claim 1, wherein the controller is further configured to:
  divide the PWM signal into a first PWM signal and a second PWM signal, wherein the first PWM signal and the second PWM signal are out of phase;
  output the second PWM signal to the second slave device; and
  modulate the first PWM signal using the correction current.

7. The apparatus of claim 1, further comprising:
  a power converter integrated in the first slave device, wherein the controller is configured to control the power converter using the modulated PWM signal.

8. A system comprising:
  a master device;
  a first slave device connected to the master device; and
  a second slave device connected to the master device and the first slave device,
  wherein:
    the first slave device being configured to:
      receive a first pulse width modulation (PWM) signal;
      detect a first sensed current;
      receive a first voltage signal associated with the second slave device;
      generate a first correction current based on the first sensed current and the first voltage signal; and
      modulate the first PWM signal using the first correction current; and
    the second slave device being configured to:
      receive a second PWM signal;
      detect a second sensed current;
      receive a second voltage signal associated with the first slave device;
      generate a second correction current based on the second sensed current and the second voltage signal; and
      modulate the second PWM signal using the second correction current.

9. The system of claim 8, wherein the second PWM signal and the first PWM signal are the same PWM pulse, and in response to the sensed current of the first slave device being less than the sensed current of the second slave device:
  the first correction current represents a first current difference between the first sensed current and the first external current in response to the first sensed current being less than the second sensed current; and
  the second correction current is zero-valued in response to the first sensed current being less than the second sensed current.

10. The system of claim 8, wherein:
  the second PWM signal and the first PWM signal are the same PWM pulse;
  the first voltage signal and the second voltage signal are created based on an average current among a plurality of sensed currents of a plurality of slave devices, and the first voltage signal and the second voltage signal are identical;
  the plurality of sensed currents includes the first sensed current and the second sensed current;

the plurality of slave devices includes two or more slave devices, the two or more slave devices include the first slave device and the second slave device;

the first correction current represents a first current difference between the first sensed current and the average current; and the second correction current represents a second current difference between the second sensed current and the average current.

11. The system of claim 8, wherein:

the second PWM signal and the first PWM signal are the same PWM pulse;

the first voltage signal is based on a scaled amount of the first sensed current of the first slave device, the scaled amount being based on a scaling factor;

the second voltage signal is based on a scaled amount of the second sensed current of the second slave device based on the scaling factor;

the first correction current represents a first difference between the first sensed current and the scaled amount of the first sensed current; and the second correction current represents a current difference between the second sensed current and the scaled amount of the second sensed current.

12. The system of claim 8, wherein:

the second PWM signal and the first PWM signal are the same PWM pulse;

the first voltage signal is created based on the second sensed current;

the first voltage signal is received by the first slave device from a first communication bus connecting the first slave device and the second slave device;

the first slave device is configured to determine, based on the first voltage signal, an average current between the first sensed current and the second sensed current;

the first correction current represents a first current difference between the first sensed current and the average current;

the second voltage signal is created based on the first sensed current;

the second voltage signal is received by the second slave device from a second communication bus connecting the first slave device and the second slave device;

the second slave device is configured to determine, based on the second voltage signal, the average current between the first sensed current and the second sensed current; and the second correction current represents a second current difference between the second sensed current and the average current.

13. The system of claim 8, wherein:

the first slave device is configured to:

divide the first PWM signal into the second PWM signal and a third PWM signal, wherein the second PWM signal and the third PWM signal are out of phase;

output the second PWM signal to the second slave device, wherein the modulation of the PWM signal includes a modulation of the third PWM signal using the first correction current;

the second slave device is configured to:

receive the second PWM signal from the first slave device; and divide the second PWM signal into a fourth PWM signal and a fifth PWM signal, wherein the fourth PWM signal and the fifth PWM signal are out of phase, wherein the modulation of the second PWM signal includes a modulation of the fourth PWM signal using the second correction current.

14. The system of claim 8, wherein the master device, the first slave device, and the second slave device are parts of a multiphase power regulation system.

15. A method for controlling an apparatus comprising a controller integrated in a first slave device, the method comprising:

detecting, by the controller, a sensed current of the first slave device;

receiving, by the controller, a voltage signal associated with a second slave device connected to the first slave device;

generating, by the controller, a correction current based on the sensed current of the first slave device and the voltage signal, wherein the correction current represents a current difference between the sensed current of the first slave device and at least an average current between the sensed current of the first slave device and the sensed current of the second slave device;

modulating, by the controller, a pulse width modulation (PWM) signal received by the first slave device using the correction current; and controlling, by the controller, a power converter using the modulated PWM signal.

16. The method of claim 15, wherein in response to the sensed current of the first slave device being less than the sensed current of the second slave device:

the correction current further represents a current difference between the sensed current and a current corresponding to the voltage signal.

17. The method of claim 15, wherein:

the voltage signal is based on an average current among a plurality of sensed currents of a plurality of slave devices;

the plurality of sensed currents includes the sensed current of the first slave device and the sensed current of the second slave device;

the plurality of slave devices includes the first slave device and the second slave device; and in response to the voltage signal being based on the average current among the plurality of sensed currents, the correction current further represents a current difference between the sensed current and the average current among the plurality of sensed currents.

18. The method of claim 15, wherein:

the voltage signal is based on a scaled amount of the sensed current of the first slave device; and in response to the voltage signal being based on the scaled amount of the sensed current of the first slave device, the correction current further represents a current difference between the sensed current and the scaled amount of the sensed current.

19. The method of claim 15, wherein:

the voltage signal is based on the sensed current of the second slave device; and the method further comprises, based on the voltage signal, determining, by the controller, the average current between the sensed current of the first slave device and the sensed current of the second slave device.

20. The method of claim 15, further comprising:

dividing, by the controller, the PWM signal into a first PWM signal and a second PWM signal, wherein the first PWM signal and the second PWM signal are out of phase; and outputting, by the controller, the second PWM signal to the second slave device; and wherein the modulation of the PWM signal includes a modulation of the first PWM signal using the correction current.

\* \* \* \* \*